United States Patent
Nakayama et al.

(10) Patent No.: US 7,220,028 B2
(45) Date of Patent: May 22, 2007

(54) WINKER APPARATUS

(75) Inventors: Masaru Nakayama, Saitama (JP);
Hiroyuki Osugi, Saitama (JP); Yoji Kanaoka, Saitama (JP); Shinichi Maeda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 311 days.

(21) Appl. No.: 10/934,377

(22) Filed: Sep. 7, 2004

(65) Prior Publication Data
US 2005/0083703 A1      Apr. 21, 2005

(30) Foreign Application Priority Data
Sep. 9, 2003      (JP) .............. 2003-317591

(51) Int. Cl.
*B62J 6/00*      (2006.01)
(52) U.S. Cl. ..................... 362/474; 362/540
(58) Field of Classification Search ........ 362/473–476, 362/540; 174/481, 68.1, 251, 135, 72 A; 248/51
See application file for complete search history.

(56) References Cited
U.S. PATENT DOCUMENTS 6,619,818 B2 * 9/2003 Grove ................. 362/267
6,802,632 B2 * 10/2004 Kajitori et al. ........... 362/473
2004/0095776 A1 * 5/2004 Pisula .................. 362/473
2004/0145897 A1 * 7/2004 Felty ................... 362/473

FOREIGN PATENT DOCUMENTS

JP       2003-89381 A       3/2003

\* cited by examiner

*Primary Examiner*—Renee Luebke
*Assistant Examiner*—Julia A. Shallenberger
(74) *Attorney, Agent, or Firm*—Birch, Stewart, Kolasch & Birch, LLP

(57) ABSTRACT

To provide a winker apparatus in which assembly thereof is improved by eliminating the necessity to check biting of the winker cord. A front winker includes a winker holder mountable to a front fork. A winker body is mountable to one side of the winker holder via a winker supporting base. A winker cord is lead from the winker holder via the winker supporting base. The winker holder is formed with a storage groove for accommodating the winker cord. A cover is provided for covering the storage groove so as to retain the winker cord in a state in which the winker cord is stored in the storage groove.

18 Claims, 6 Drawing Sheets

WINKER APPARATUS

CROSS-REFERENCE TO RELATED APPLICATIONS

This nonprovisional application is related to Patent Application No. 2003-317591, filed in Japan on Sep. 9, 2003, the entirety of which is incorporated herein by reference.

BACKGROUND OF THE INVENTION

1. Field of the Invention

The present invention relates to a winker apparatus for a vehicle such as a motorcycle.

2. Description of Background Art

In the related art, a motorcycle's winker apparatus includes a winker body mounted to a winker holder, which is fixed to a vehicle body such as a front fork, via a winker supporting base. The winker holder is normally divided into a pair of holder member halves, and is mounted in such a manner that the respective holder members sandwich the vehicle body. A winker cord, which extends from the winker body, is lead out via the winker supporting base, passes through a storage groove for the winker cord formed on the inner periphery of one of the holder members and taken out from the winker holder on the opposite side from the winker supporting base, that is, on the widthwise inner side of the vehicle before being wired (for example, see JP-A-2003-89381).

However, with the winker apparatus as described above, it is necessary to ensure that the winker cord does not come off the storage groove on the holder member in order to prevent the winker cord from being bitten when mounting the winker holder to the vehicle body. Therefore, there has been a demand for improvement of such a problem in order to improve assembly of the winker apparatus itself.

SUMMARY OF THE INVENTION

Accordingly, the present invention provides a winker apparatus in which the necessity of checking biting of the winker cord is eliminated to improve the assembly thereof.

As means for solving the problem described above, according to an embodiment of the present invention, a winker apparatus (for example, a front winker 40 in an embodiment) includes a winker holder (for example, a winker holder 41 in the embodiment) mounted to a vehicle body (for example, a front fork 3 in the embodiment). A winker body (for example, a winker body 43 in the embodiment) is mounted to one side of the winker holder via a winker supporting base (for example, a winker supporting base 42 in the embodiment). A winker cord (for example, a winker cord 44 in the embodiment) is lead via the winker supporting base. Furthermore, a storage groove (for example, a storage groove 47 in the embodiment), which can accommodate the winker cord, is formed on the winker holder. A cover (for example, a cover 48 in the embodiment) is provided for covering the storage groove so as to retain the winker cord in a state in which the winker cord is stored in the storage groove.

According to another embodiment of the present invention the vehicle body to which the winker holder is mounted is a front fork.

In this arrangement, the winker cord stored in the storage groove is prevented from fallen off the storage groove when mounting the winker holder to the vehicle body (for example, a front fork). Therefore, it is unnecessary to hold the winker cord or check whether or not the winker cord is bitten between the winker holder and the vehicle body any longer.

According to a further embodiment of the present invention, the cover is formed of resin.

In this arrangement, a countermeasure for protecting the winker cord from damage is unnecessary in comparison with the case in which the cover is formed, for example, of metal plate. Furthermore, a complex shape may be realized relatively easily.

According to an additional embodiment of the present invention, the cover is locked to the winker holder by resilient engagement.

In this arrangement, the number of parts and the number of assembly steps for mounting the cover to the winker holder may be reduced in comparison with the case where the cover is mounted by the use of fastening members such as screws.

Also, according to an embodiment of the present invention, when the cover is provided with an extension (for example, an extension 90A in the embodiment) extending toward the winker body with respect to a mounting portion (for example, a rear holder member 46 in the embodiment) with respect to the vehicle body of the winker holder, the cover may be mounted to the winker holder while retaining the extension. Therefore, the cover can be easily mounted even when the cover is locked to the winker holder by resilient engagement at a secluded spot on the mounting portion of the winker holder with respect to the vehicle body.

Furthermore, according to a further embodiment of the present invention, when the extension is formed so as to be engaged resiliently by the winker holder, positioning of the cover with respect to the winker holder is achieved by the extension. Therefore, the cover mounting work can further be facilitated.

According to an embodiment of the present invention, when mounting the winker holder to the vehicle body, it is unnecessary to hold the winker cord or check whether or not the winker cord is bitten between the winker holder and the vehicle body. Therefore, assembly of the winker apparatus itself may be improved.

According to another embodiment of the present invention, a countermeasure for protecting the winker cord from damage is unnecessary in comparison with the case in which the cover is formed, for example, of a metal plate, and a complex shape may be realized relatively easily. Therefore, improved protection of the winker cord and cost reduction is achieved.

According to a further embodiment of the present invention, the number of parts and the number of assembly steps for mounting the cover to the winker holder may be reduced. Therefore, assembly of the winker apparatus itself may be improved.

Also, according to an embodiment of the present invention, the cover can be easily mounted even when the cover is locked to the winker holder by resilient engagement at a secluded spot on the mounting portion of the winker holder with respect to the vehicle body. Therefore, assembly of the winker apparatus itself can be further improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
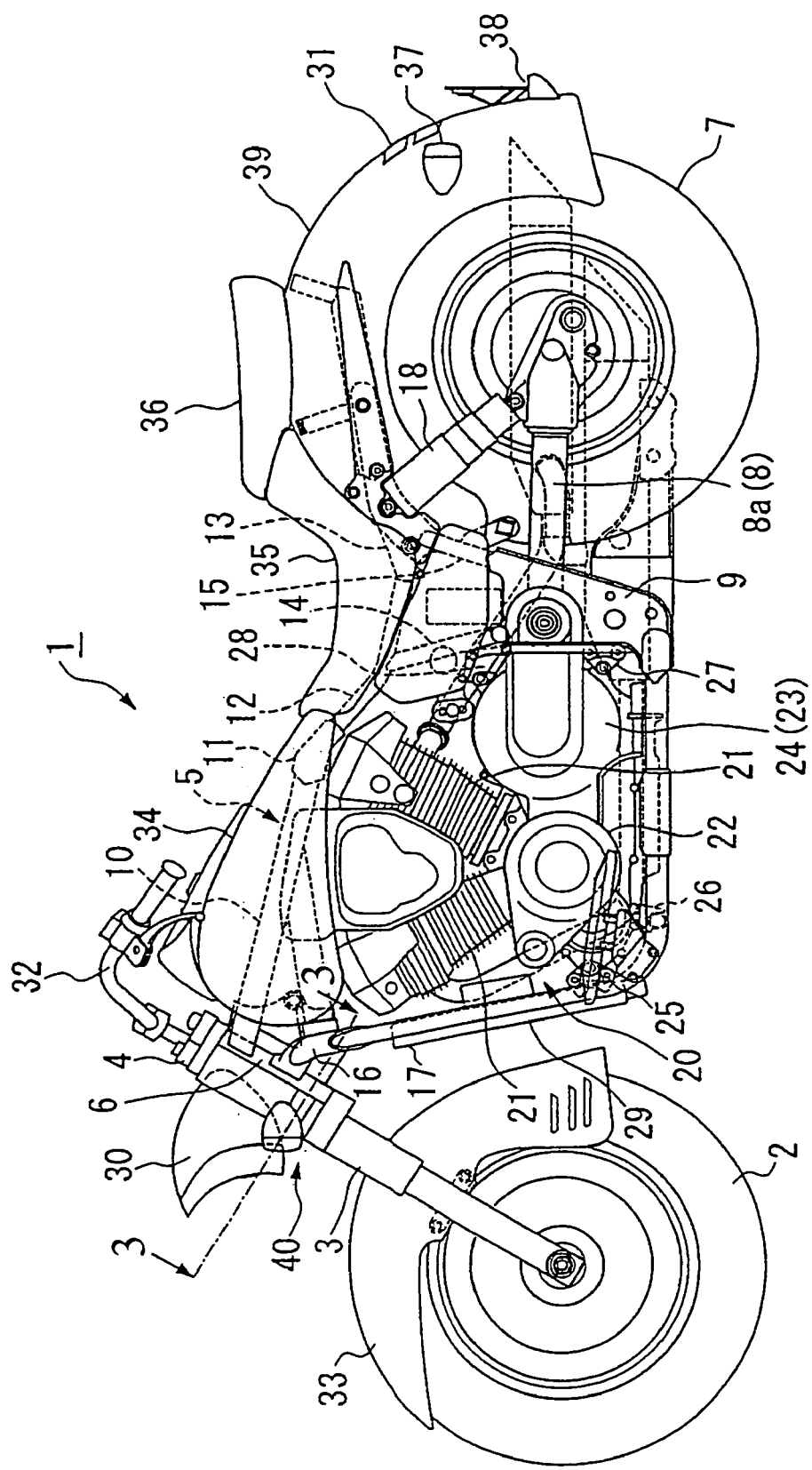
FIG. 1 is a side view of a motorcycle according to the present invention when viewed from the left side.

The present invention will now be described with reference to the accompanying drawings, wherein the same or similar elements have been identified by the same reference numeral throughout the several views. The directions front, rear, left, and right in the description below are identical to those of the vehicle. Arrows LH in the drawing indicate the left hand of the vehicle.

As shown in FIG. 1, a pair of left and right front forks (vehicle body) 3 rotatably supporting a front wheel 2 of a motorcycle 1 are steerably supported by a head pipe 6 of a vehicle body frame 5 via a steering stem 4 at the upper ends thereof. Rear swing arms 8 for rotatably supporting a rear wheel 7 are swingably supported at the front ends thereof by pivot plates 9 provided at the rear portion of the vehicle body frame 5.

The vehicle body frame 5 includes a main pipe 10 extending from the upper portion of the head pipe 6 rearward. An upper pipe joint 11 is joined to the rear portion of the main pipe 10. A pair of left and right center upper pipes 12 branch toward the left and right from the upper pipe joint 11 and extend rearward. A pair of left and right rear brackets 13 are connected to the rear portions of the respective center upper pipes 12, respectively. Center pipes 14 extending from the respective center upper pipes 12 downward and rear pipes 15 extending from the respective rear brackets 13 downward are connected to the front side and the rear side of the upper portion of the pivot plates 9, respectively. A gusset 16 is joined to the lower portion of the head pipe 6. The rear ends of a pair of left and right down pipes 17 branching toward the left and right from the gusset 16, extending downward and then being bent, and extending rearward are connected to the lower front side of the pivot plates 9. Rear cushions 18 are provided between the rear brackets 13 and the rear swing arms 8.

An engine 20 is mounted to the portion surrounded by the center upper pipes 12, the down pipes 17, and the pivot plates 9 and the like. The engine 20 is a V-type two-cylinder engine having two cylinder portions 21 disposed into substantially a V-shape in side view. A transmission case 24 for storing a transmission 23 is connected to the rear portion of a crankcase 22 disposed below the respective cylinder portions 21. The engine 20 and the transmission 23 are supported by the vehicle body frame 5 by the front end and the lower end of the crankcase 22 connected to the down pipe 17 via brackets 25, 26 and the upper and lower rear ends of the transmission case 24 connected to the pivot plates 9 via brackets 27, 28. A radiator 29 to be supported by the down pipes 17 is disposed forwardly of the engine 20. The rear swing arms 8 have a pair of left and right fork portions 8a extending rearwardly from the front ends thereof, and a drive shaft, not shown, is inserted into one (left one in this embodiment) of the fork portions 8a. Drive force of the engine 20 is transmitted to the rear wheel 7 via the drive shaft.

Figure 2:
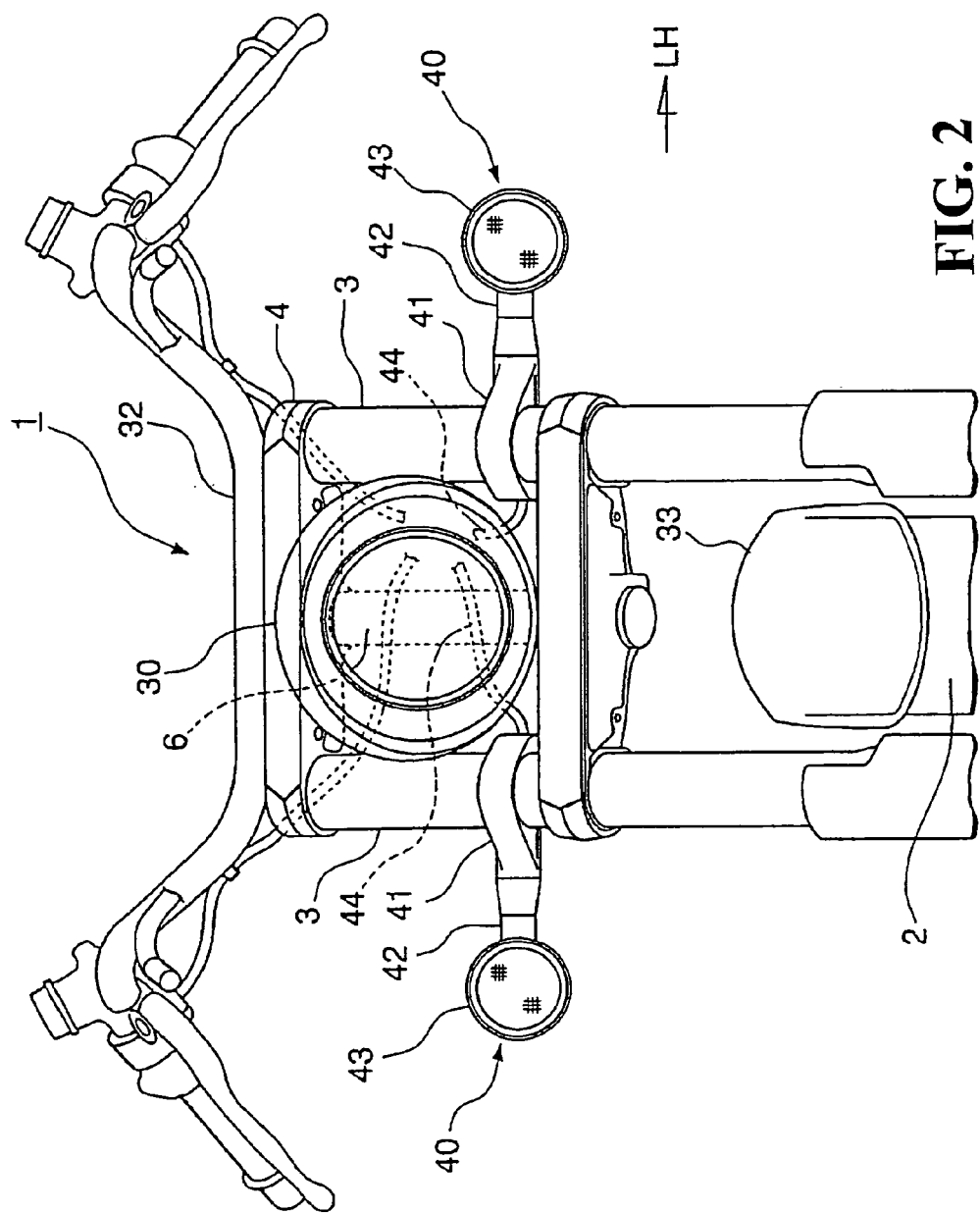
FIG. 2 is a front view of the motorcycle.

Referring also to FIG. 2, a head light 30 is disposed on the upper portions of the front forks 3, 3 at the widthwise center of the vehicle. A pair of left and right front winkers (winker apparatus) 40, 40 according to the present invention are disposed on both sides of the lower end of the head light 30. A steering handle 32 is mounted to the upper end of the front forks 3. A front fender 33 for covering the upper side of the front wheel is mounted to the lower side of the front forks 3.

A tear-drop type fuel tank 34 is disposed on the upper portion of the vehicle body frame 5. A main seat 35 for a rider is disposed behind the fuel tank 34. The front portion of the main seat 35 is placed on the vehicle body frame 5 and the rear portion thereof is placed on a rear fender 39.

The rear fender 39 is fabricated by forming a steel plate material so as to cover the upper side of the rear wheel 7, and the front portion thereof is fixed to the rear bracket. A pillion seat 36 for a fellow passenger continuing from the rear end of the main seat 35 is disposed on the rear fender 39. A pair of left and right rear winkers 37 are provided on both sides of the rear portion of the rear fender 39. A tail lamp 31 is provided on the rear face at the rear portion of the rear fender 39. A license plate mounting portion and a license holder 38 having a license lamp are disposed below the tail lamp 31.

Figure 3:
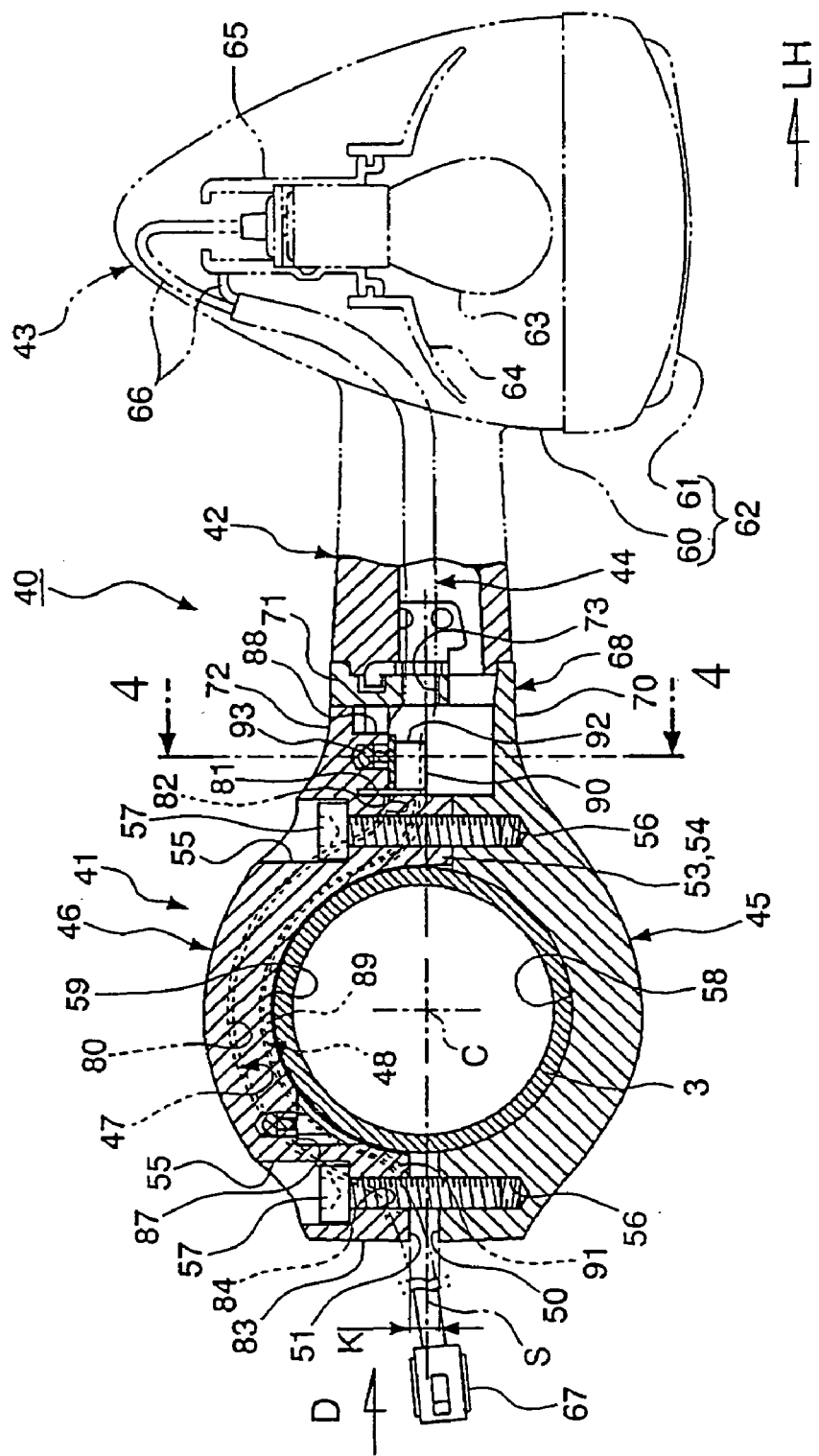
FIG. 3 is a cross-sectional view taken along the line 3—3 in FIG. 1.

As shown in FIG. 3, a left front winker 40 includes a winker holder 41 to be mounted to the front fork 3, a winker body 43 supported on the widthwise outer side (left side) of the winker holder 41 via a winker supporting base 42, and a winker cord 44 lead from the winker body 43 via the winker supporting base 42. The below description will be for the left front winker 40. A description of the right winker 40 is omitted since it has a symmetrical structure.

The winker holder 41 is an annular member having a shaft hole of substantially the same diameter as the outer diameter of the front fork 3 and an axis C common with the front fork 3. The winker holder 41 is formed of two halves of a front holder member 45 and a rear holder member 46 divided along a dividing plane S along the axis C. The respective holder members 45, 46, in pair, serve as a mounting portion of the winker holder 41 with respect to the vehicle body.

The rear holder member 46 is formed with a storage groove 47 extending continuously from the inner periphery thereof, which aligns with the outer periphery of the front fork 3, and both sides thereof, and being capable of accommodating the winker cord 44. A cover 48 formed, for example, of polypropylene (resin) is mounted to the rear holder member 46 for covering the storage groove 47 in such a manner that the winker cord 44 is stored in the storage groove 47. The winker cord 44 is adapted to be lead through the winker supporting base 42, passed through the storage groove 47, and taken out outside the winker holder 41 on the inner side (left side) of the front fork 3 widthwise of the vehicle. The winker cord 44 taken out from the inner side of the winker holder 41 in the widthwise of the vehicle is led to the left side of the head pipe 6 behind the head light 30 together with harnesses extending from the switch box on the handle 32, and wired toward the rear of the vehicle body (See FIG. 2).

On the right side section of the winker holder 41 located on the right side of the front fork 3, opposing surfaces 50, 51 of the respective holder members 45, 46 extending in parallel with the diving plane S are disposed at a position away from each other in a state in which the winker holder 41 is attached to the front fork 3. A space K is provided between these opposing surfaces 50, 51. On the left end section of the winker holder 41 located on the left side of the front fork 3, a projection 53 formed by deforming the rear holder member 46 at the intermediate portion in the direction along the axis C toward to the front holder member 45. A recess 54 is formed on the front holder member 45 so as to fit with the projection 53 (See FIG. 4). The distal plane of the projection 53 and the bottom plane of the recess 54 abut against each other in a state in which the respective holder members 45, 46 are attached to the front fork 3.

Also, bolt insertion holes 55, 55 extending along the direction orthogonal to the dividing plane S are formed at both side ends of the rear holder member 46. Screw holes 56, 56 corresponding to the respective bolt insertion holes 55 are formed on the front holder member 45. The respective bolt insertion holes 55 and the screw holes 56 are positioned on the winker holder 41 substantially at center in the direction along the axis C. In other words, the bolt insertion hole 55 passes through the projection 53 and the screw hole 56 is formed at the bottom of the recess 54. The respective holder members 45, 46 are disposed so as to sandwich the front fork 3. A fastening bolt 57 inserted into the respective bolt insertion holes 55 of the rear holder member 46 is screwed into the respective screw holes 56 of the front holder member 45 and fastened, so that the respective holder members 45, 46 clamp the front fork 3, in a state in which inner peripheral surfaces 58, 59 of the respective holder members 45, 46 are in tight contact with the outer peripheral surface of the front fork 3. Therefore, the winker holder 41 is detachably attached to the front fork 3.

The winker body 43 includes a winker lens 61 mounted to a front opening of a winker case 60 to form a lamp body 62. The lamp body 62 includes a winker valve 63 and a reflector 64 provided therein. A plurality of conductor wires 66 are connected to a socket member 65 for holding the winker valve 63. The respective conductor wires 66 are bundled with an insulating tube or the like into a single winker cord 44. A coupler 67 for connecting to the main harness or the like of the motorcycle 1 is provided at the extremity of the winker cord 44. The winker supporting base 42 is a cylindrical member extending from the winker body 43 toward the right and is formed integrally with, or joined to, the lamp body 62. The winker cord 44 passes within the winker supporting base 42 and taken out from the winker body 43.

Figure 4:
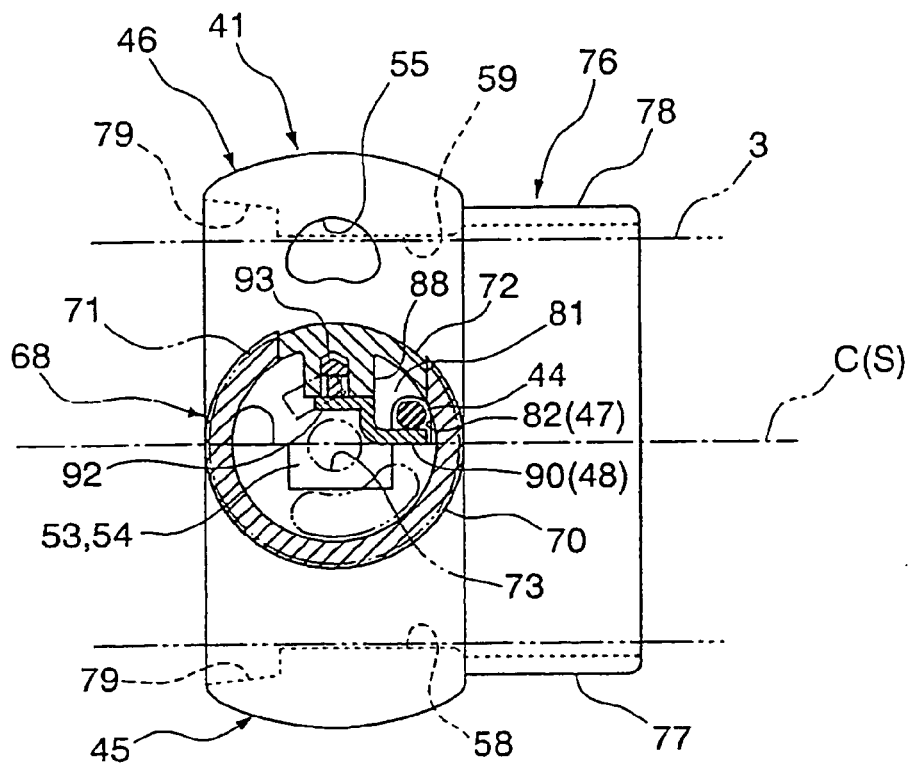
FIG. 4 is a cross-sectional view taken along the line 4—4 in FIG. 3.

Referring also to FIG. 4, a cylindrical connecting unit 68 is provided at the left end of the winker holder 41 so as to project therefrom. The winker supporting base 42 is connected to the connecting unit 68. The connecting unit 68 includes a cylindrical member 70 projecting form the left side surface of the winker holder 41 toward the left (toward the winker body 43). A disk-shaped lid 71 is provided on the left end of the cylindrical member 70. The axis of the connecting unit 68 (axis of the cylindrical member 70) is provided in the direction parallel to the direction of the width of the vehicle, as in the case of the axis of the winker supporting base 42. The portion of the cylindrical member 70 on the side of the rear holder member 46 includes a separately formed rear wall section 72. The rear wall section 72 is formed integrally with the rear holder member 46. The portion of the cylindrical member 70 on the side of the front holder member 45 other than the rear wall section 72 and the disk-shaped lid 71 are formed integrally with the front holder member 45. In other words, the winker body 43 is fixed to the front holder member 45.

The disk-shaped lid 71 of the connecting unit 68 to which the right end of the winker supporting base 42 is connected is formed with a lead-out hole 73 for the winker cord 44 at the center thereof. A cylindrical skirt section 76 having a larger inner diameter than the outer diameter of the front fork 3 is formed below the winker holder 41. Two halves of arcuate members 77, 78 formed by dividing the skirt section 76 along the dividing plane S are formed integrally with the holder members 45, 46 respectively. The upper portion of the holder members 45, 46 are formed with larger diameter portions 79 formed by deforming the inner peripheral surfaces 58, 59 thereof radially outward, respectively.

The winker cord 44 is led from the lead-out hole 73 of the disk-shaped lid 71 into the connecting unit 68, is passed through the storage groove 47 formed on the inner peripheral surface of the rear holder member 46 and the left and right side ends thereof, is lead toward the right side along the outer periphery thereof while bypassing the front fork 3, and is taken out of the winker holder 41 on the right side of the rear holder member 46.

Figure 5:
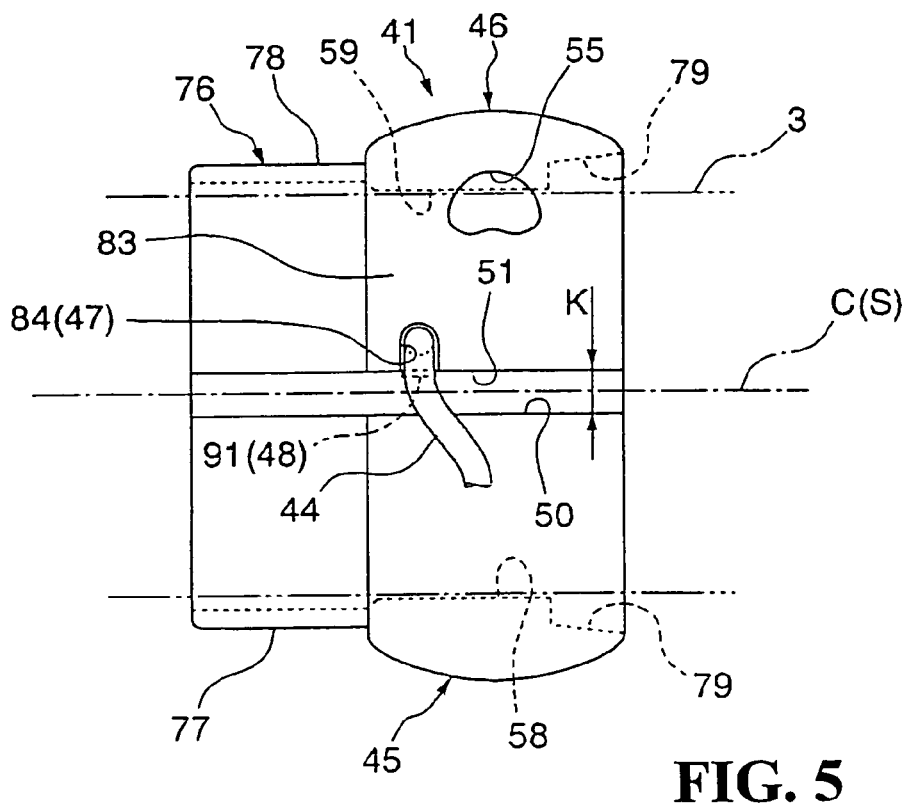
FIG. 5 is a drawing when viewed in the direction indicated by an arrow D in FIG. 3.

The storage groove 47 includes a curved groove portion 80 formed on the inner periphery of the rear holder member 46 along the circumferential direction thereof, a left side groove portion 82 formed on the left side of the rear holder member 46 so as to continue smoothly from the left end of the curved groove portion 80 and reach a left end surface 81 of the rear holder member 46, and a right side groove portion 84 formed on the right side of the rear holder member 46 so as to continue smoothly from the right end of the curved groove portion 80 and reach a right end surface 83 of the rear holder member 46 (See FIG. 5). The width of the storage groove 47 is slightly wider than the diameter of the winker cord 44, and the depth thereof is at least a value of the diameter of the winker cord 44 added with the thickness of the cover 48.

Figure 6:
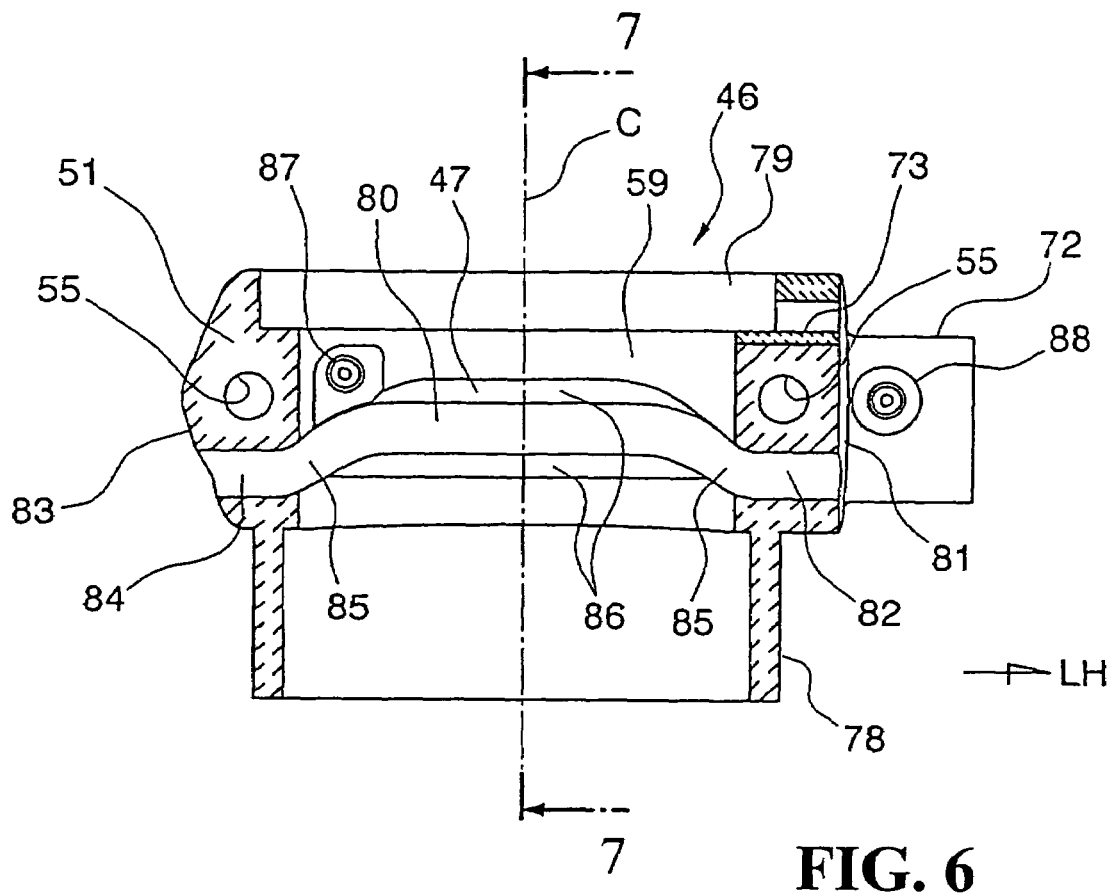
FIG. 6 is a front view of a rear holder member.

As shown in FIG. 6, the left side groove portion 82 and the right side groove portion 84 of the storage groove 47 are formed on the rear holder member 46 at the position downwardly of the center portion thereof in the direction along the axis C of the rear holder member 46 so as to bypass the portion formed with the screw hole 56. The curved groove portion 80 is formed at the position closer to the center in the direction of the axis C of the rear holder member 46 in comparison with the both side grooves 82, 84, that is, at the position upwardly of the both side grooves 82, 84. Both ends of the curved groove portion 80 are formed with inclined portions 85, 85 inclining so as to be lower as they approach the both side grooves 82, 84, so that the curved groove portion 80 continues to the both side grooves 82, 84 via the respective inclined portions 85.

Figure 7:
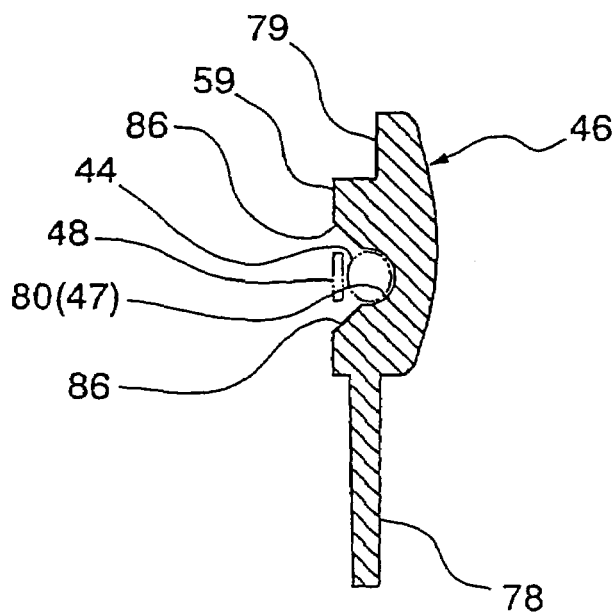
FIG. 7 is a cross-sectional view taken along the line 7—7 in FIG. 6.

A description of FIG. 7 will now be provided. At the position of the curved groove portion 80 between the respective inclined portions 85 along the ridges between the curved groove portion 80 and the inner peripheral surface 59 of the rear holder member 46, inclined surfaces 86, 86 ore formed inclining so as to increase the groove width of the storage groove 47 as it approaches the front holder member

45. The respective inclined surfaces 86 serve as guiding surfaces when storing the winker cord 44 in the storage groove 47, so that the winker cord 44 can easily be stored in the storage groove 47.

Formed above the right side of the curved groove portion 80 is a seat surface 87 extending in substantially parallel with the dividing plane S formed by partly cutting out the inner peripheral surface 59. A recessed right clip hole is formed at substantially a center of the seat surface 87. At the portion of the rear wall section 72 at the upper left of the left end of the storage groove 47, there is formed a boss member 88 having a left clip hole so as to project toward the front holder member 45. The cover 48 is mounted so as to cover the storage groove 47 from the side of the front holder member 45 using the respective clip holes.

Figure 8:
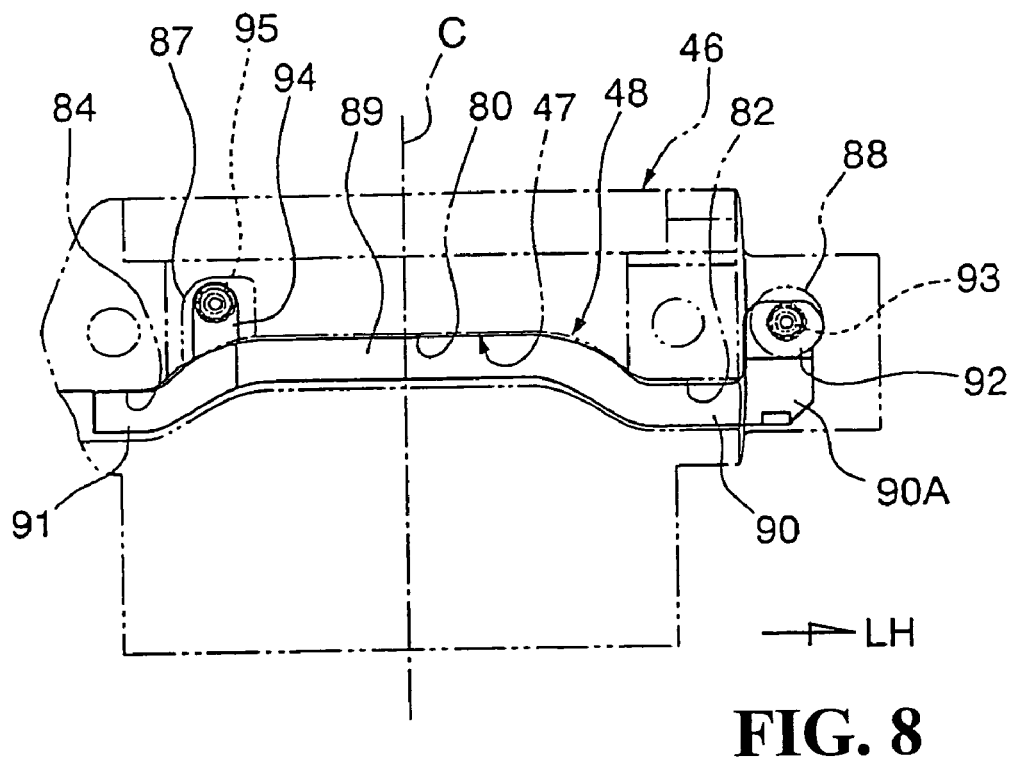
FIG. 8 is a front view of a cover.
Figure 9:
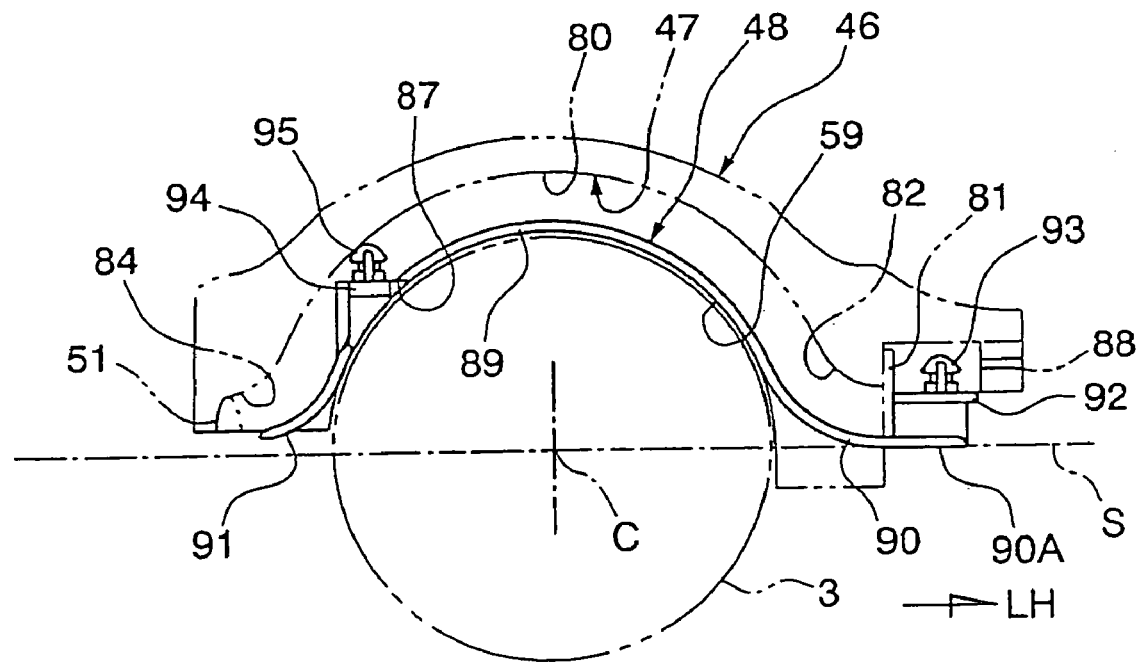
FIG. 9 is a plan view of the cover.

As shown in FIG. 8 and FIG. 9, the cover 48 is a member having a width slightly narrower than the width of the storage groove 47 and includes a curved cover member 89 formed along the opening portion of the curved groove portion 80 of the storage groove 47 toward the front holder member 45 for covering the same. A left cover member 90 and a right cover member 91 are formed so as to continue smoothly to both ends of the curved cover member 89 along the openings of both side grooves 82, 84 of the storage groove 47 toward the front holder member 45 so as to cover the same.

The left cover member 90 protrudes leftward from the left end (the left end surface 81 of the rear holder member 46) of the storage groove 47. The left cover member 90 protrudes. Therefore, an extension 90A of the cover 48 extending leftward (toward the winker body 43) from the rear holder member 46 is provided. Upwardly of the extension 90A, there are provided a left clip base 92 to be abutted against the distal surface of the boss member 88 in a state in which the cover 48 is mounted to the rear holder member 46. A left clip 93 projects from the left clip base 92 toward the rear holder member 46. Above the right end of the curved cover member 89, there are provided a right clip base 94 to be abutted against the seat surface 87 in a state in which the cover 48 is mounted to the rear holder member 46. A right clip 95 projects from the right clip base 94 toward the rear holder member 46. When the respective clips 93, 95 of the cover 48 are fitted (resilient engagement) into the corresponding clip holes, the cover 48 is locked by the rear holder member 46.

The inner peripheral surface of the curved cover member 89 is substantially flush with the inner peripheral surface 59 of the rear holder member 46. Therefore, in the state in which the winker holder 41 is attached to the front fork 3, the curved cover member 89 is securely locked by the inner peripheral surface thereof being brought into abutment with the outer peripheral surface of the front fork 3.

The left cover member 90 is formed so that the surface on the side of the front holder member 45 is substantially flush with the diving plane S. In a state in which the winker holder 41 is mounted to the front fork 3, they are securely fixed by bringing the surface of the left cover member 90 on the side of the front holder member 45 into abutment with the wall surface of the front holder member 45 on the dividing plane S (See FIG. 4).

Furthermore, the surface of the right cover member 91 on the side of the front holder member 45 is formed so as to be substantially flush with the opposing surface 51 of the rear holder member 46. On the right side of the winker holder 41, a space between the right cover member 91 and the bottom of the storage groove 47 decreases. The winker cord 44 taken out toward the right side of the winker holder 41 resiliently deforms the right cover member 91. Part of it is taken out so as to pass in the space K on the right side of the winker holder 41 (See FIG. 3). Therefore, on the right side of the winker holder 41, the winker cord 44 is clamped between the right cover member 91 and the storage groove 47.

According to the embodiment described above, the front winker 40 includes the winker holder 41 mounted to the front fork 3, the winker body 43 mounted to the widthwise outside of the winker holder 41 via the winker supporting base 42, and the winker cord 44 lead through the winker supporting base 42. The winker holder 41 is provided with the storage groove 47 for accommodating the winker cord 44, and the cover 48 for covering the storage groove 47 so as to retain the winker cord 44 in a state in which the winker cord 44 is stored in the storage groove 47. Accordingly, the winker cord 44 stored in the storage groove 47 may be prevented from falling off the storage groove 47 when the winker holder 41 is mounted to the front fork 3. Therefore, it is not necessary to hold the winker cord 44 by hand to prevent the winker cord 44 from falling out of the storage groove 47, or to check whether or not the winker cord 44 is bitten between the winker holder 41 and the front fork 3. Therefore, assembly of the front winker 40 itself may be improved.

Since the cover 48 is formed of resin, in comparison with the case in which a cover formed, for example, of a metal plate is employed, a countermeasure for protecting the winker cord 44 from damage (such as rubber coating) is not necessary, and a complex shape may be realized relatively easily, protection of the winker cord 44 may be improved, and cost reduction is achieved.

In addition, the winker cord 44 lead from the winker supporting base 42 is passed through the storage groove 47 before it is lead out toward the inner side of the winker holder 41 in the direction of the width of the vehicle. Therefore, wiring may be simplified in comparison with the case in which the winker cord 44 is exposed from the winker supporting base 42 toward the outside, the good appearance of the motorcycle 1 is achieved, and protection of the winker cord 44 may be improved.

Furthermore, the cover 48 is resiliently engaged with the rear holder member 46 by the respective clips 93, 95. Accordingly, the number of parts and the number of assembly steps for mounting the cover 48 to the winker holder 41 is reduced in comparison with the case in which the cover 48 is attached using fastening members such as screws. Therefore, assembly of the front winker 40 itself may be improved.

Still further, the extension 90A extends from the rear holder member 46 toward the winker body 43. Accordingly, the cover 48 may be attached to the rear holder members 46 while holding the extension 90A. Therefore, even when the cover 48 is locked to the winker holder 41 by resilient engagement at a secluded spot (for example, the seat surface 87) of the rear holder member 46, the cover 48 can be easily mounted. In addition, when the extension 90A is adapted to be resiliently engaged with the rear holder member 46 by the left clip 93 positioned upwardly thereof, positioning of the cover 48 with respect to the winker holder 41 can be performed by the extension 90A and hence mounting of the cover 48 may further be facilitated. Accordingly, assembly of the front winker 40 itself may further be improved.

The present invention is not limited to the embodiment, and for example, the structure in which the storage groove 47 is formed on the front holder member 45. Also, the winker holder 41 may be formed integrally. Furthermore, the structure in which the cover 48 is assembled to the winker cord 44 with a tube or a tape in advance may also be employed, whereby assembly of the front winker 40 itself may further be improved. Still further, the vehicle body, to which the winker holder 41 is mounted, is not limited to the front fork 3, and may be the vehicle body frame 5 or the member to be connected thereto. In other words, it may also be applied to the rear winker 37. The structure in the embodiment is simply an example, and it is also applicable not only to the motorcycle 1, but also to vehicles such as a three wheeler and a four wheeler, and may be modified without departing from the scope of the invention, as a matter of course.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A winker apparatus, comprising:
    a winker holder having a front holder member and a rear holder member, said winker holder being mountable to a vehicle body;
    a winker supporting base;
    a winker body, said winker body being mountable to one side of said winker holder by said winker supporting base; and
    a winker cord, said winker cord being lead from said winker body via said winker supporting base, wherein
    a storage groove, which can accommodate the winker cord, is formed on an inner peripheral surface of the rear holder member of said winker holder, and
    a cover member formed along the opening portion of the storage groove in which the winker cord is accommodated for covering the storage groove so as to retain the winker cord in a storage position in the storage groove.

2. The winker apparatus according to claim 1, wherein the vehicle body to which said winker holder is mountable is a front fork.

3. The winker apparatus according to claim 1, wherein said cover is formed of resin.

4. The winker apparatus according to claim 2, wherein said cover is formed of resin.

5. The winker apparatus according to claim 1, wherein said cover is locked to said winker holder by resilient engagement.

6. The winker apparatus according to claim 2, wherein said cover is locked to said winker holder by resilient engagement.

7. The winker apparatus according to claim 5, wherein said cover is provided with an extension extending toward said winker body with respect to a mounting portion with respect to the vehicle body of said winker holder.

8. The winker apparatus according to claim 6, wherein said cover is provided with an extension extending toward said winker body with respect to a mounting portion with respect to the vehicle body of said winker holder.

9. The winker apparatus according to claim 7, wherein said extension is formed so as to be engaged resiliently by said winker holder.

10. The winker apparatus according to claim 8, wherein said extension is formed so as to be engaged resiliently by said winker holder.

11. A winker holder for a winker apparatus, the winker apparatus including the winker holder, a winker supporting base, a winker body and a winker cord, said winker holder comprising:
    a front holder member;
    a rear holder member;
    a storage groove, which can accommodate the winker cord, said storage groove being formed on an inner peripheral surface of the rear holder member of said winker holder;
    a cover member formed along the opening portion of the storage groove in which the winker cord is accommodated for covering the storage groove so as to retain the winker cord in a storage position in the storage groove.

12. The winker holder according to claim 11, wherein said cover is formed of resin.

13. The winker holder according to claim 11, wherein said cover is locked to said winker holder by resilient engagement.

14. The winker holder according to claim 13, wherein said cover is provided with an extension extending toward the winker body with respect to a mounting portion of said winker holder.

15. The winker holder according to claim 14, wherein said extension is formed so as to be engaged resiliently by said winker holder.

16. A winker holder for a winker apparatus, the winker apparatus including the winker holder, a winker supporting base, a winker body and a winker cord, said winker holder comprising:
    a storage groove, which can accommodate the winker cord, said storage groove being formed on said winker holder; and
    a cover for covering the storage groove so as to retain the winker cord in a storage position in the storage groove,
    wherein said winker holder is an annular member having a shaft hole formed therein for receiving a front fork of a vehicle body.

17. The winker holder according to claim 16, wherein said annular member includes a front holder member and a rear holder member separated from each other along a plane that passes through a central axis of the annular member.

18. The winker holder according to claim 17, wherein said groove is formed in said rear holder member.

* * * * *